United States Patent
Yao (10) Patent No.: US 11,251,711 B2
(45) Date of Patent: Feb. 15, 2022

(54) CURRENT CONTROL CIRCUIT AND POWER CONVERTER

(71) Applicant: Silergy Semiconductor Technology (Hangzhou) LTD, Hangzhou (CN)

(72) Inventor: Kaiwei Yao, Sunnyvale, CA (US)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 4 days.

(21) Appl. No.: 16/846,649

(22) Filed: Apr. 13, 2020

(65) Prior Publication Data

US 2020/0336069 A1   Oct. 22, 2020

(30) Foreign Application Priority Data

Apr. 18, 2019   (CN) .......................... 201910313936.2

(51) Int. Cl.
*H02M 3/158* (2006.01)
*H02M 1/00* (2006.01)

(52) U.S. Cl.
CPC ....... *H02M 3/1588* (2013.01); *H02M 1/0009* (2021.05); *H02M 3/158* (2013.01)

(58) Field of Classification Search
CPC .. H02M 3/1588; H02M 1/0009; H02M 3/158; H02M 1/0025; H02M 3/1584
See application file for complete search history.

(56) References Cited

U.S. PATENT DOCUMENTS

| | | | |
|---|---|---|---|
| 5,528,481 A | 6/1996 | Caldeira et al. | |
| 5,548,206 A * | 8/1996 | Soo ...................... | H02M 3/1588 323/284 |
| 8,310,846 B2 | 11/2012 | Piazzesi | |
| 8,917,068 B2 | 12/2014 | Chen et al. | |
| 9,331,588 B2 | 5/2016 | Chen | |
| 9,762,113 B2 | 9/2017 | Chen et al. | |
| 2008/0088283 A1* | 4/2008 | Ruobiao ............. | H02M 3/1588 323/271 |
| 2014/0253062 A1* | 9/2014 | Qin ..................... | H02M 3/1588 323/271 |
| 2015/0078041 A1 | 3/2015 | Huang | |
| 2015/0311810 A1 | 10/2015 | Chen et al. | |
| 2017/0047853 A1 | 2/2017 | Chen et al. | |
| 2019/0190387 A1* | 6/2019 | Dalena ................. | H03K 5/1532 |
| 2020/0333379 A1* | 10/2020 | Yao ........................ | H02M 3/158 |

* cited by examiner

*Primary Examiner* — Kyle J Moody (57) ABSTRACT

A current control circuit for a power converter can include: a sense transistor coupled to a power transistor to be sensed; and a control circuit configured to control a voltage at a power terminal of the sense transistor in order to mirror a current flowing through the power transistor, to control the sense transistor to generate a sense current, and to generate a control signal for controlling operation states of the power transistor in accordance with the sense current and a reference current.

16 Claims, 8 Drawing Sheets

CURRENT CONTROL CIRCUIT AND POWER CONVERTER

RELATED APPLICATIONS

This application claims the benefit of Chinese Patent Application No. 201910313936.2, filed on Apr. 18, 2019, which is incorporated herein by reference in its entirety.

FIELD OF THE INVENTION

The present invention relates to the field of power electronics, and more particularly to current control circuits and power converters.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

A power converter (e.g., AC-DC, DC-DC, DC-AC, and AC-AC) is a circuit that is current-controlled in order to convert an input voltage to a desired output voltage. Some converters may require precise current regulation or current feedback in order to maintain the desired output voltage. Therefore, current sensing techniques can be very important. To facilitate current sensing for power converters, resistance sensing is widely used. In such an approach, a resistor can be placed in a circuit that needs to sense a current. However, this approach can introduce additional conduction losses, and may not be suitable for high-current applications.

A common non-destructive current detection approach utilizes the on-resistance (Rds_on) (e.g., drain-source resistance) of a power transistor of the power converter to sense the current. When the power transistor is turned on, the voltage across the power transistor is equal to the product of the current flowing through thereof and on-resistance Rds_on. However, the value of on-resistance Rds_on may vary greatly in different stages, and also can change with temperature, which may lead to complex current sensing circuitry and inaccurate current sensing.

In one embodiment, a current control circuit for a power converter can include: (i) a sense transistor coupled to a power transistor to be sensed; and (ii) a control circuit configured to control a voltage at a power terminal of the sense transistor in order to mirror a current flowing through the power transistor, to control the sense transistor to generate a sense current, and to generate a control signal for controlling operation states of the power transistor in accordance with the sense current and a reference current.

Figure 1:
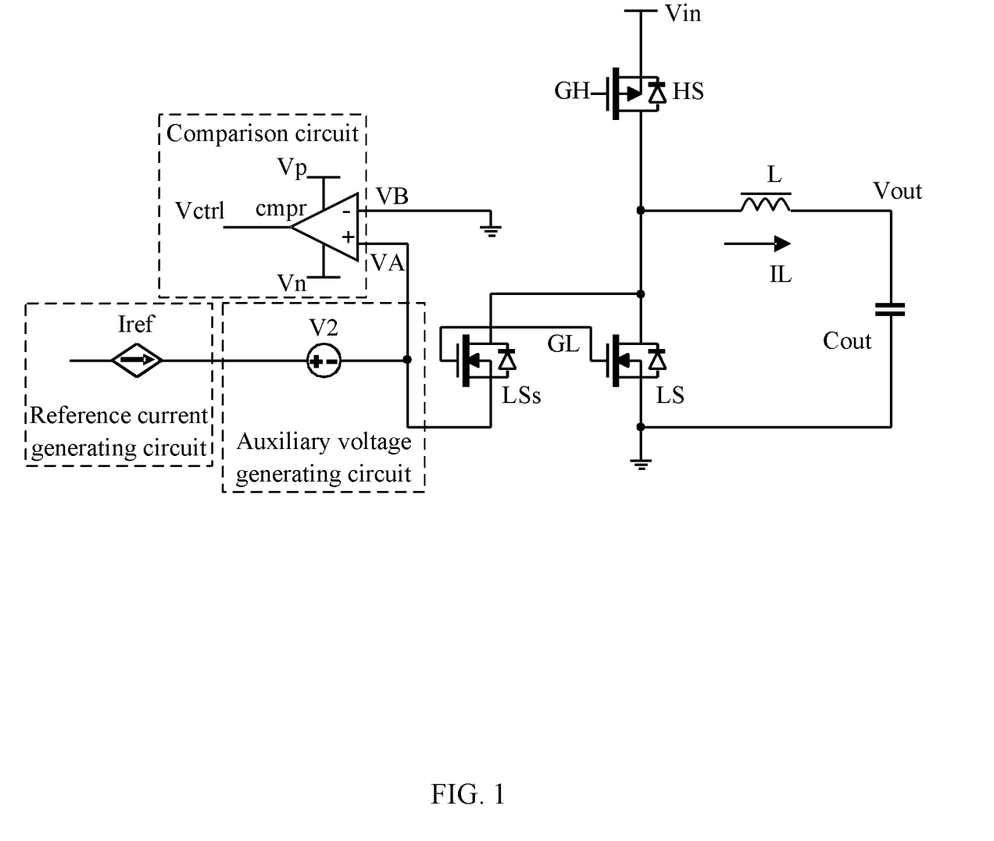
FIG. 1 is a schematic block diagram of a first example current control circuit, in accordance with embodiments of the preset invention.

Referring now to FIG. 1, shown is a schematic block diagram of a first example current control circuit, in accordance with embodiments of the preset invention. In this particular example, a synchronously rectified buck converter can include power transistor HS and power transistor LS. This example current control circuit can include sense transistor LSs and a control circuit. In one example, sense transistor LSs can connect to power transistor LS. The control circuit may control a voltage at a power terminal of sense transistor LSs, in order to control sense transistor LSs to mirror a current flowing through power transistor LS to be sensed, such that sense transistor LSs may generate a sense current. Then, the control circuit can generate a control signal for controlling operation states of the power transistor to be sensed in accordance with the sense current and a reference current.

For example, the control circuit can include a comparison circuit and an auxiliary voltage generating circuit. The current flowing through sense transistor LSs may be proportional to the current flowing through the power transistor to be sensed at a first moment, thereby performing current control for the buck converter. In this example, the sense transistor and the power transistor can both be metal-oxide-semiconductor field-effect transistors (MOSFETs). It should be understood that other types of transistors, such as a bipolar-junction transistor (BJT), etc., can also be applied in certain embodiments, as long as the structures and the types of the sense transistor and the power transistor are the same.

In one example, the synchronously rectified buck converter may operate with valley current-control. Here, the power transistor to be sensed is power transistor LS, and power transistor LS is an N-type MOSFET. A control terminal of sense transistor LSs can connect to a control terminal (e.g., the gate) of the power transistor LS, and a power terminal (e.g., the drain) of sense transistor LSs can connect to a power terminal of the same type (e.g., the drain) of power transistor LS. That is, the two transistors can be configured with common-gate and common-drain connections.

The comparison circuit can compare the voltages at the power terminals (e.g., the source terminals) of sense transistor LSs and power transistor LS, and may generate control signal Vctrl. In this example, the voltage at the source terminal of power transistor LS is a fixed value (e.g., zero). Further, the sense transistor may be the same type as the power transistor to be sensed, and the area of the sense transistor may be 1/N of the area of the power transistor to be sensed, where N is a positive number. The layout arrangement can be used to make the on-resistance of a transistor inversely proportional to the area of the transistor and the on-resistance not sensitive to process changes, and as such the on-resistance of the sense transistor can be set to be N times that of the power transistor. In this way, when the voltages at the two input terminals of the comparison circuit are equal at a given moment (e.g., at the "first" moment or time point), the sensed current flowing through the sense transistor is 1/N of the current flowing through the power transistor to be sensed.

The auxiliary voltage generating circuit can generate auxiliary voltage V2, and the comparison circuit can receive bidirectional reference current Iref. In one example, the comparison circuit can include comparator cmpr, and a non-inverting input terminal of comparator cmpr can connect to the source terminal of sense transistor LSs. Since the source terminal of power transistor LS is grounded, an inverting input terminal of comparator cmpr is grounded. Further, reference current Iref of the buck converter can be generated by a reference current generating circuit, and the auxiliary voltage generating circuit can connect between the reference current generating circuit and the non-inverting input terminal of comparator cmpr. The auxiliary voltage generating circuit may have a negative terminal connected to the non-inverting input terminal of comparator cmpr, and can generate auxiliary voltage V2. Due to the auxiliary voltage generating circuit, comparator cmpr can receive bidirectional reference current Iref. That is, the auxiliary voltage generating circuit may have the ability to sink and to provide a current at the same time.

In this particular example, the voltages at the gate terminals of sense transistor LSs and power transistor LS are the same, the voltages at the drain terminals of sense transistor LSs and power transistor LS are the same, and the structures and the types of sense transistor LSs and power transistor LS are the same. When the voltages at the two input terminals of comparator cmpr are equal (e.g., when the voltages at the source terminals of sense transistor LSs and power transistor LS are equal), the on-resistance of sense transistor LSs can be N times that of power transistor LS. Thus, sense current Isen flowing through sense transistor LSs may be 1/N of current IL flowing through power transistor LS, such that control signal Vctrl generated by comparator cmpr at the output terminal is active.

In addition, the voltages at the positive and negative power supply terminals of comparator cmpr are voltage Vp and voltage Vn, respectively. In this example, voltage Vn may be grounded, and voltage Vp is supply voltage Vcc of the comparator. Further, auxiliary voltage V2 generated by the auxiliary voltage generating circuit can be greater than voltage Vn and less than voltage Vp. When reference current Iref is positive (e.g., flowing in the direction as shown in the FIG. 1), reference current Iref can flow into the auxiliary voltage generating circuit, and the auxiliary voltage generating circuit can absorb the current. Since the voltage of the non-inverting input terminal of comparator cmpr can be equal to zero at a given moment, if a reverse reference current is needed to be generated in this case, the voltage of the reference current generation circuit may need to be less than zero. However, a negative voltage can be difficult to directly generate in a general circuit. Therefore, an auxiliary voltage generating circuit can be included in order to provide a current, such that reference current Iref can be bidirectional.

Figure 2:
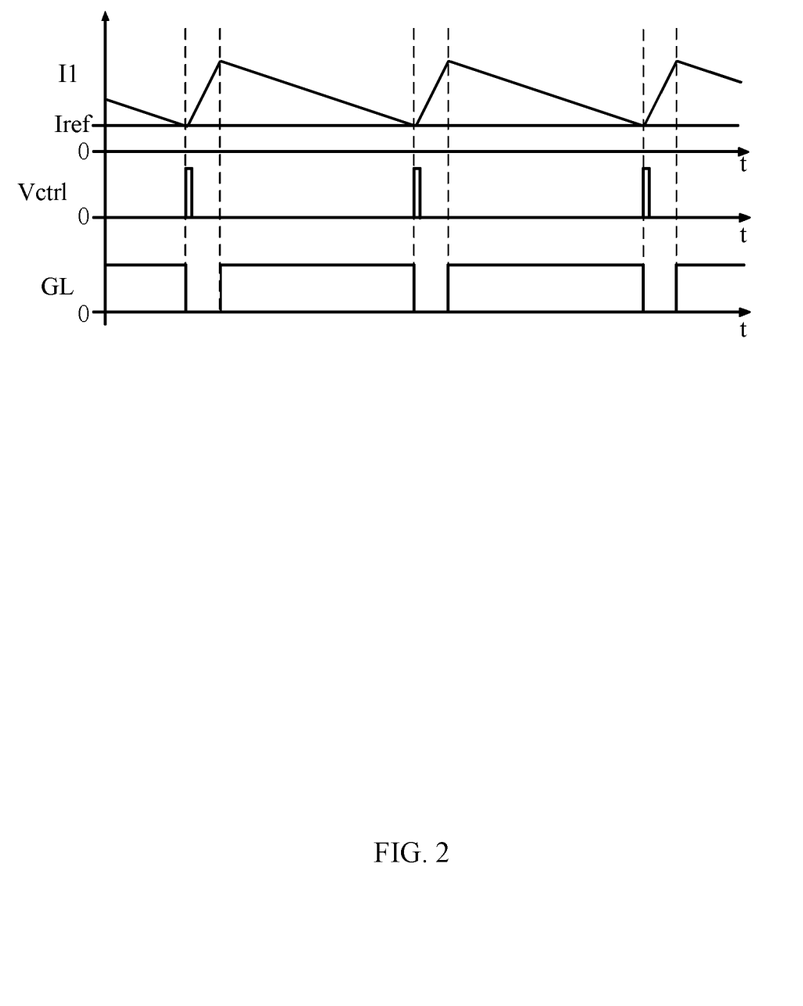
FIG. 2 is a waveform diagram of example operation of the first example current control circuit with valley current control, in accordance with embodiments of the preset invention.

Referring now to FIG. 2, shown is a waveform diagram of example operation of the first example current control circuit with valley current control, in accordance with embodiments of the preset invention. To simplify the description, delays related to the circuit and signal transmission are omitted. The waveforms of current I1 equal to IL/N, reference current Iref, control signal Vctrl, and drive signal GL of power transistor LS varying with time are shown in FIG. 2. Also with reference to FIG. 1, since the gate and drain terminals of sense transistor LSs are respectively connected with the gate and drain terminals of power transistor LS, when voltage $V_A$ at the non-inverting input terminal of comparator cmpr is equal to voltage $V_B$ at inverting input terminal of comparator cmpr, sense current Isen flowing through sense transistor LSs is proportional to the current flowing through power transistor LS. Further, voltage VA at the non-inverting input terminal of comparator cmpr can be expressed as follows.

$$VA = Iref \times Rdson1 - IL \times Rdson = Rdson1 \times (Iref - IL/N) \quad (1)$$

Here, Rdson1 is the on-resistance of sense transistor LSs, Rdson is the on-resistance of power transistor LS, and Rdson1 is N times Rdson. When inductor current IL flowing through inductor L is relatively large, current I1 may be greater than reference current Iref, such that voltage VA is less than voltage VB (e.g., 0), and control signal Vctrl generated by comparator cmpr is low. When the inductor current decreases to make voltage VA at the non-inverting input of comparator cmpr increase to voltage VB at the inverting input terminal at a moment (e.g., at the first moment, which is when sense current Isen decreases to reference current Iref at the first vertical dashed line), control signal Vctrl is high, power transistor LS is turned off, power transistor HS is turned on, and then the inductor current starts to increase.

When the inductor current increases to make voltage VA decrease to be less than VB, control signal Vctrl is low, such that control signal Vctrl becomes a narrow pulse waveform. It can be seen from FIG. 2 that control signal Vctrl can be a high level at the valley value of the sense current during each switching cycle, which may be used for the valley current control to control the power devices in the power converter for switching operation. Those skilled in the art will recognize that the current control circuit of this example can alternatively be used for peak current control, or other suitable current control.

Figure 3:
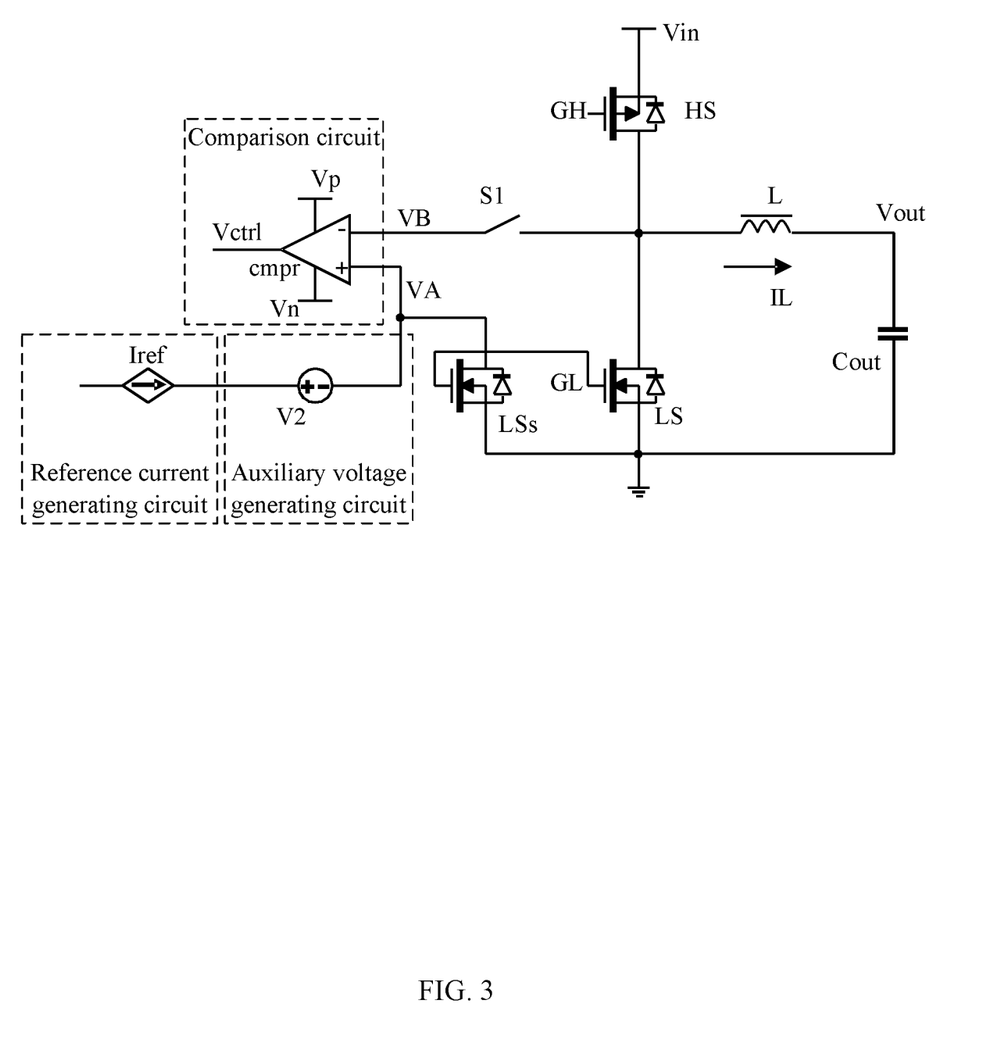
FIG. 3 is a schematic block diagram of a second example current control circuit, in accordance with embodiments of the preset invention.

Referring now to FIG. 3, shown is a schematic block diagram of a second example current control circuit, in accordance with embodiments of the preset invention. In this particular example, the gate and source terminals of sense transistor LSs can be connected to the gate and source terminals of power transistor LS respectively. That is, sense transistor LSs and power transistor LS can be configured with common-gate and common-source connections. The non-inverting input terminal of comparator cmpr can connect to the drain terminal of sense transistor LSs, and the inverting input terminal of comparator cmpr can be coupled to the drain terminal of power transistor LS through switch S1. Further, the switching state of switch S1 may be the same as that of power transistor LS.

When power transistor LS is turned on, switch S1 may also be turned on, and the inverting input terminal of comparator cmpr can be pulled down to ground. During conduction of power transistor LS, voltages VA and VB at the two input terminals of comparator cmpr may still meet the above relationship in the formula (1) in the first example current control circuit. That is, when voltage VA is less than voltage VB (e.g., voltage VA<0), that is, when reference current Iref is less than current I1 (=IL/N), control signal Vctrl generated by comparator cmpr can be low. When the inductor current decreases to make voltage VA increase to voltage VB, control signal Vctrl may be high. When power transistor LS is turned off, switch S1 can also be turned off, and then the current control circuit may not be operable.

Figure 4:
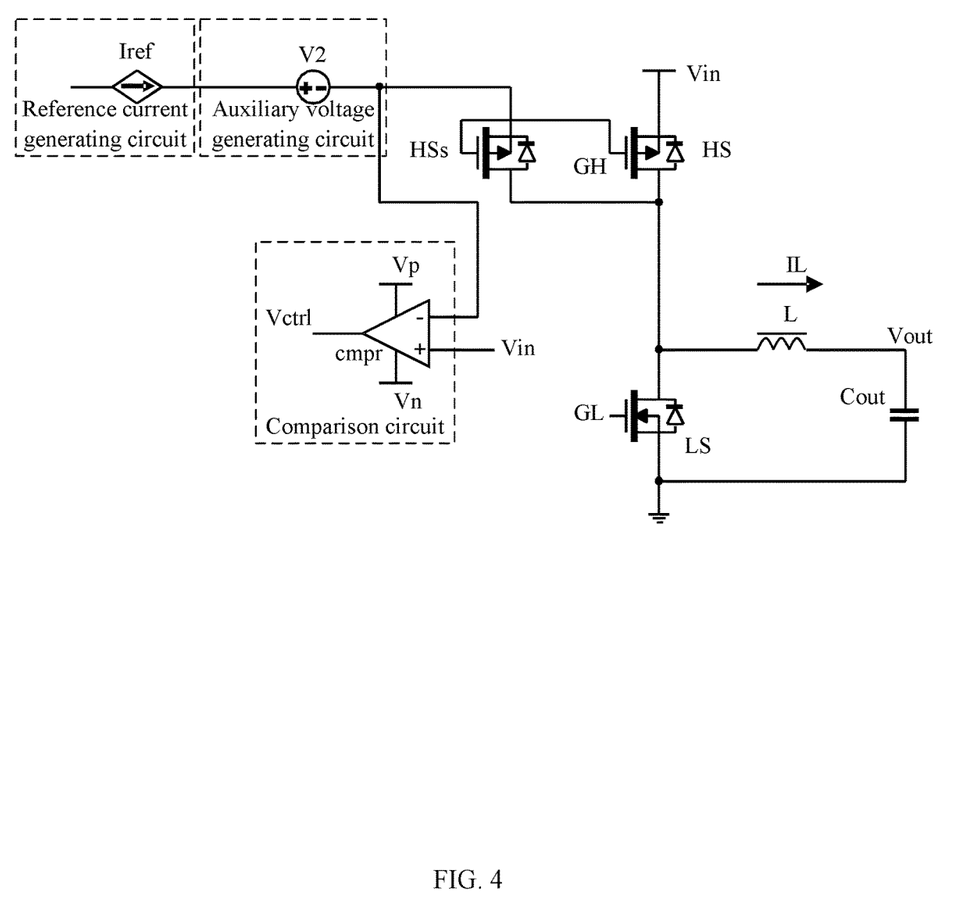
FIG. 4 is a schematic block diagram of a third example current control circuit, in accordance with embodiments of the preset invention.

Referring now to FIG. 4, shown is a schematic block diagram of a third example current control circuit, in accordance with embodiments of the preset invention. In this particular example, the power transistor to be sensed is power transistor HS (e.g., a P-type MOSFET). The current control circuit can include sense transistor HSs, a comparison circuit, and an auxiliary voltage generating circuit. The control terminal (e.g., the gate) of sense transistor HSs can connect to the control terminal (e.g., the gate) of power transistor HS, and a power terminal (e.g., the drain) of sense transistor HSs can connect to a power terminal of the same type (e.g., the drain) of power transistor HS. That is, power transistor HS and sense transistor HSs may be configured with common-gate and common-drain connections.

The comparison circuit can compare the voltages at the other power terminals (e.g., the source terminals) of sense transistor HSs and power transistor HS, and may generate control signal Vctrl. In this example, the voltage at the source terminal of power transistor HS is a fixed value (e.g., input voltage Vin). Further, the sense transistor may be the same type as the power transistor to be sensed, and the area of the sense transistor may be 1/N of the area of the power transistor to be sensed, where N is a positive number. The on-resistance of a transistor can be made inversely proportional to the area of the transistor by layout and it may not be sensitive to process changes. As such, the on-resistance of the sense transistor can be set to be N times that of the power transistor to be sensed. In this way, when the voltages at the two input terminals of the comparison circuit can be equal at a moment (e.g., at the first moment), the sense current flowing through the sense transistor can be 1/N of the current flowing through the power transistor to be sensed.

The auxiliary voltage generating circuit can generate auxiliary voltage V2, and the comparison circuit can receive bidirectional reference current Iref. The inverting input terminal of comparator cmpr can connect to the source terminal of sense transistor HSs, and the non-inverting input of comparator cmpr can connect to the source terminal of power transistor HS. Further, reference current Iref of the buck converter can be generated by a reference current generating circuit, and an auxiliary voltage generating circuit can connect between the reference current generating circuit and the non-inverting input terminal of comparator cmpr. The auxiliary voltage generating circuit may have a negative terminal connected to the inverting input terminal of comparator cmpr, and can generate auxiliary voltage V2, such that comparator cmpr may receive a bidirectional reference current Iref. That is, the auxiliary voltage generating circuit may have the ability to sink and also to provide current.

In addition, the voltages at the positive and negative power supply terminals of comparator cmpr are voltage Vp and voltage Vn, respectively. In this example, voltage Vn may be equal to input voltage Vin, and voltage Vp can be equal to the sum of input voltage Vin and supply voltage Vcc of the comparator. Further, auxiliary voltage V2 generated by the auxiliary voltage generating circuit may be greater than voltage Vn and less than voltage Vp. When reference current Iref is positive (e.g., in the direction as shown in the FIG. 4), reference current Iref can flow into the auxiliary voltage generating circuit, and the auxiliary voltage generating circuit may absorb current. Since voltage VA at the inverting input terminal of comparator can be equal to Vin at a moment, if a reverse reference current is needed to be generated in this case, the voltage of the reference current generation circuit can be greater than input voltage Vin. However, a voltage greater than input voltage Vin can be difficult to directly generate in a general circuit. Therefore, an auxiliary voltage generating circuit can be included in order to provide a current, such that reference current Iref can be bidirectional.

Figure 5:
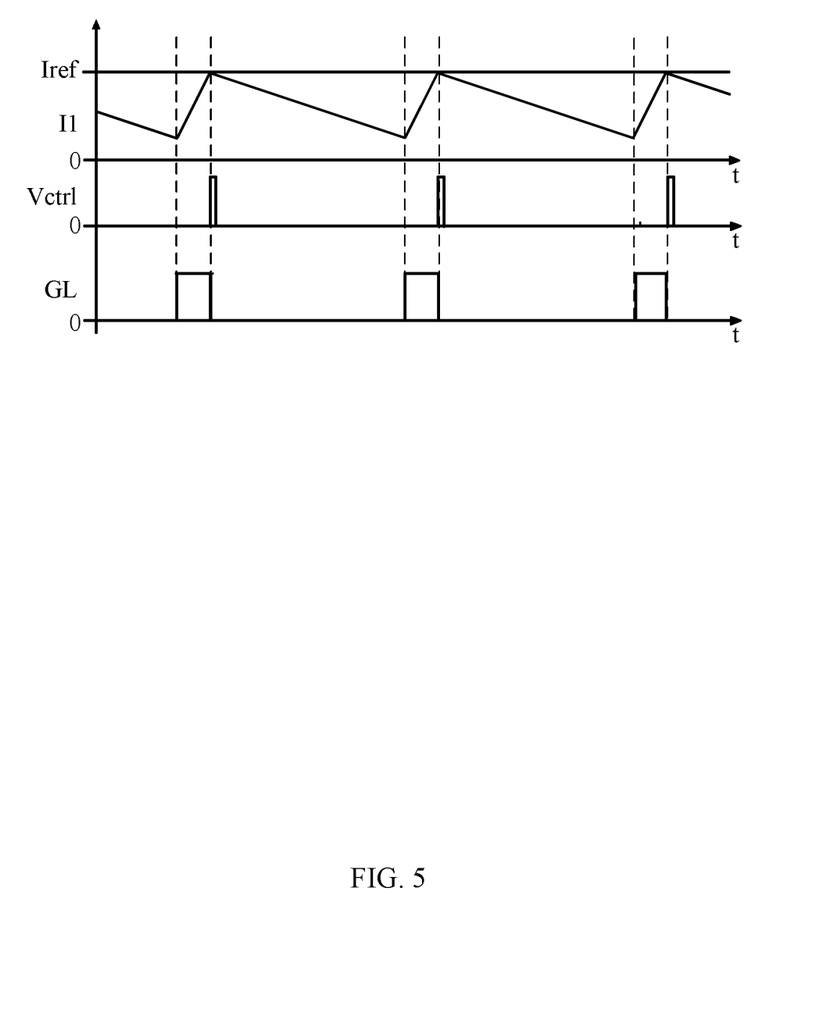
FIG. 5 is a waveform diagram of example operation of the current control circuit with peak current control, in accordance with embodiments of the preset invention.

Referring now to FIG. 5, shown is a waveform diagram of example operation of the current control circuit with peak current control, in accordance with embodiments of the preset invention. The waveforms of current I1 equal to IL/N, reference current Iref, control signal Vctrl, and drive signal GH of power transistor HS varying with time are shown in FIG. 5. Also with reference to FIG. 4, since the gate and drain terminals of sense transistor LSs are respectively connected to the gate and drain terminals of power transistor LS, when voltage VA at the inverting input terminal of comparator cmpr is equal to voltage VB at non-inverting input terminal of comparator cmpr, sense current Isen flowing through sense transistor HSs may be proportional to the current flowing through power transistor HS. Further, voltage VA at the inverting input terminal of comparator cmpr can be expressed as follows.

$$VA = Vin - IL \times Rdson + Iref \times Rdson1 = Vin + Rdson1 \times (Iref - IL/N) \quad (2)$$

Here, Rdson1 is the on-resistance of sense transistor HSs, Rdson is the on-resistance of power transistor HS, and Rdson1 is N times Rdson. When inductor current IL flowing through inductor L is relatively small, current I1 that equals to IL/N may be less than reference current Iref, such that voltage VA is greater than voltage VB (e.g., input voltage Vin), and control signal Vctrl generated by comparator cmpr is low. When the inductor current decreases to make voltage VA at the inverting input terminal of comparator cmpr increase to voltage VB at the non-inverting input terminal at a moment (e.g., at the first moment, which here is the second vertical dashed line from the left), comparator cmpr can transition and control signal Vctrl may go high, such that power transistor HS is turned off, power transistor LS is turned on, and then the inductor current starts to increase. It can be seen from FIG. 5 that control signal Vctrl can be a high level at the peak value of the sense current during each switching cycle, which can be used for peak current control in order to control the power devices in the power converter for switching operation. Other types of current control can also be employed in certain embodiments.

Figure 6:
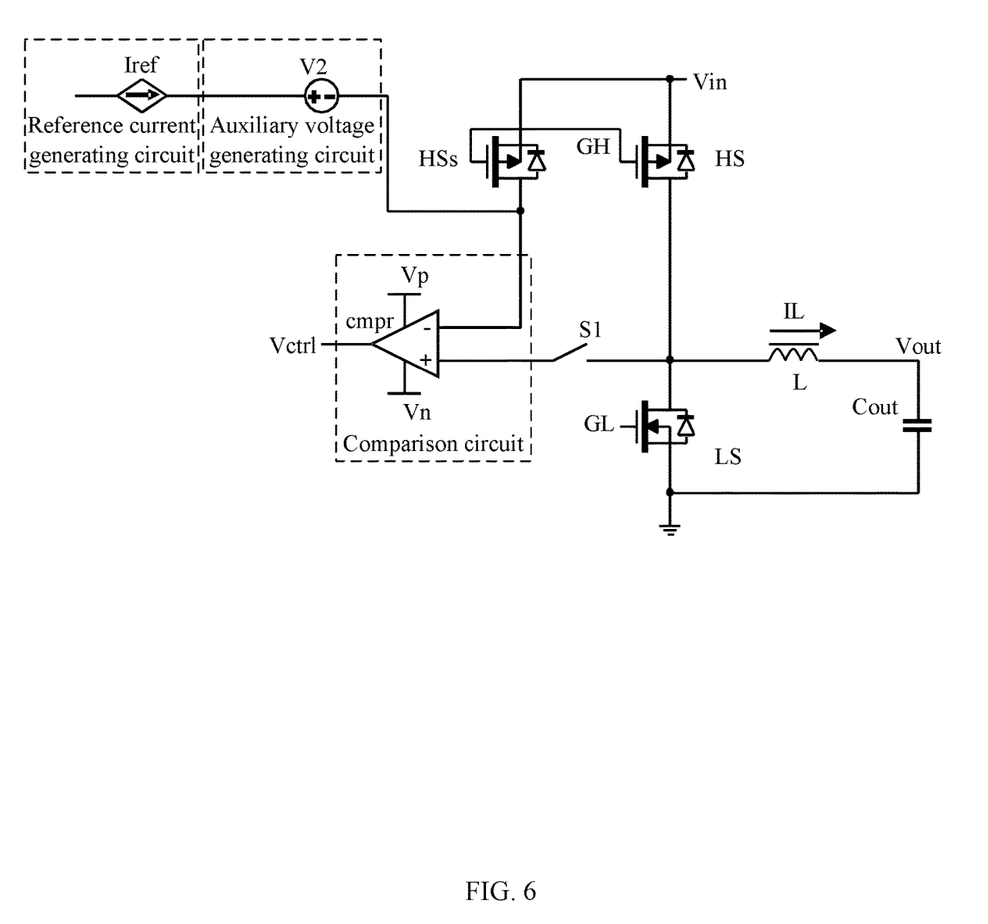
FIG. 6 is a schematic block diagram of a fourth example current control circuit, in accordance with embodiments of the preset invention.

Referring now to FIG. 6, shown is a schematic block diagram of a fourth example current control circuit, in accordance with embodiments of the preset invention. In this particular example, the gate and source terminals of sense transistor HSs can connect to the gate and source terminals of power transistor HS, respectively. That is, sense transistor HSs and power transistor HS may be configured with common-gate and common-source connections. The inverting input terminal of comparator cmpr can connect to the drain terminal of sense transistor HSs, and the non-inverting input terminal of comparator cmpr may be coupled to the drain terminal of power transistor HS through switch S1. Further, the switching state of switch S1 may be the same as that of power transistor HS.

When power transistor HS is turned on, switch S1 can also be turned on, and the inverting input terminal of comparator cmpr can be connected to input voltage Vin. During the turned-on state of power transistor HS, voltages VA and VB at the two input terminals of comparator cmpr may still meet the above relationship in the third example current control circuit. That is, when current I1 that equals to IL/N is less than reference current Iref, voltage VA is greater than voltage VB (e.g., voltage VA is greater than input voltage Vin), and control signal Vctr1 generated by comparator cmpr is low. When inductor current IL increases to make voltage VA decrease to voltage VB, comparator cmpr transitions and control signal Vctr1 may go high. When power transistor HS is turned off, switch S1 can also be turned off, and then the current control circuit may not be operational. While peak current control is used in this particular example, certain embodiments also support valley and/or other types of current control to perform switching control of a power transistor or perform current protection.

Figure 7:
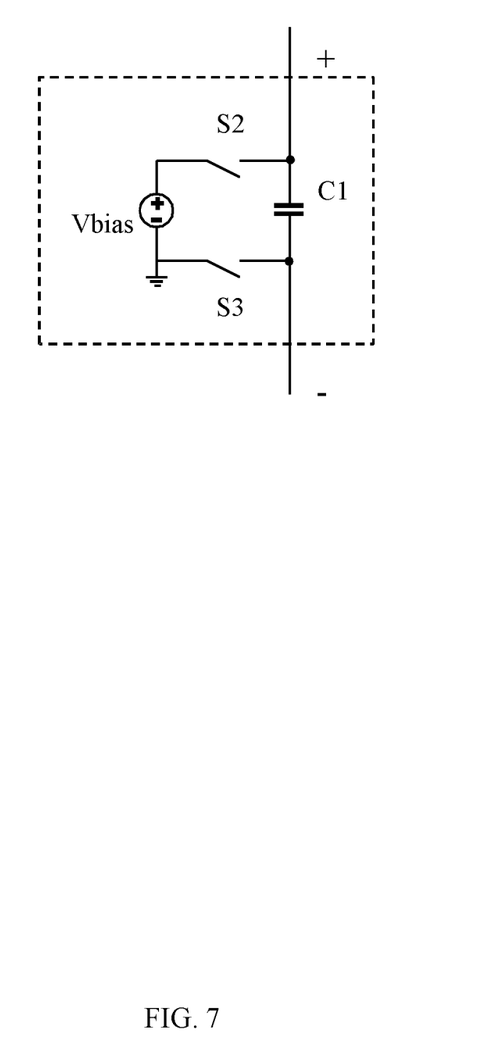
FIG. 7 is a schematic block diagram of an example auxiliary voltage generating circuit, in accordance with embodiments of the preset invention.

Referring now to FIG. 7, shown is a schematic block diagram of an example auxiliary voltage generating circuit, in accordance with embodiments of the preset invention. In this particular example, the auxiliary voltage generating circuit can include voltage source Vbias, switches S2 and S3, and capacitor C1. Switches S2 and S3 may be controlled to be turned on when the power transistor to be sensed is turned off, such that capacitor C1 is charged and/or discharged to the voltage of voltage source Vbias. Further, voltage Vbias may be greater than voltage Vn and less than voltage Vp. In this way, voltage source Vbias has the ability to sink, and also to provide current. The capacitance of capacitor C1 may be sufficiently large such that when capacitor C1 is charged and discharged by sense current Isen within one switching cycle, the voltage of capacitor C1 can be maintained within the range of voltage Vn to voltage Vp.

In one example, a clamp circuit can be added at both terminals of capacitor C1, in order to enhance the current absorption capability. Further, the voltage of capacitor C1 can be clamped to ensure that voltage V2 (see, e.g., FIG. 6) of capacitor C1 remains less than supply voltage Vcc regardless of the charging effect of sense current Isen on capacitor C1. It should be understood that a Zener diode, a cascaded coupling diode, or other circuits having a voltage clamping effect, may alternatively or additionally be implemented in parallel across the capacitor C1.

Figure 8:
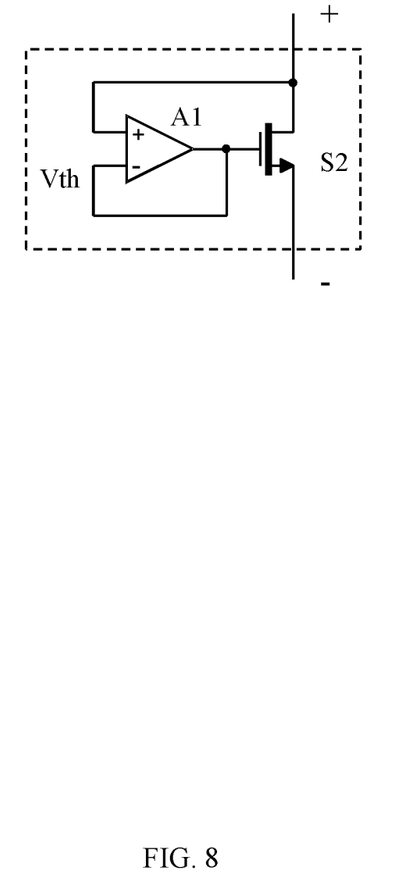
FIG. 8 is a schematic block diagram of an example clamp circuit, in accordance with embodiments of the preset invention.

Referring now to FIG. 8, shown is a schematic block diagram of an example clamp circuit, in accordance with embodiments of the preset invention. In this particular example, the clamp circuit can include operational amplifier A1. The non-inverting input terminal of operational amplifier A1 can connect to the drain terminal of switch (e.g., transistor) S2, the inverting input terminal of operational amplifier A1 can connect to the output terminal thereof, which can connect to the gate terminal of switch S2. The clamping effect is that the voltage across switch S2 can be clamped at gate threshold voltage Vth of switch S2, such that the voltage across capacitor C1 can be clamped at the sum of gate threshold voltage Vth and voltage Vbias. In addition, proper voltage source Vbias may be predetermined due to small gate threshold voltage Vth, which can ensure the voltage across capacitor C1 remains within the range of voltage Vn to voltage Vp. That is, auxiliary voltage V2 generated by the auxiliary voltage generating circuit can be guaranteed to be greater than voltage Vn and less than voltage Vp.

In particular embodiments, a current control circuit for a power converter can include a sense transistor, and the power transistor to be sensed may be turned off when the current flowing through the power transistor to be sensed is equal to N times the current flowing through the sense transistor, thereby achieving current control. In addition, the supply voltage of the comparison circuit may be reasonably set and an auxiliary voltage can be introduced to the comparison circuit, such that the reference current at the control point can be positive or negative.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A current control circuit for a power converter, the current control circuit comprising:
    a) a sense transistor coupled to a power transistor to be sensed;
    b) a control circuit configured to control a voltage at a power terminal of the sense transistor in order to generate a sense current, wherein the control circuit comprises a reference current generating circuit configured to generate a reference current, and a comparison circuit configured to generate a control signal for controlling operation states of the power transistor in accordance with the sense current and a reference current; and
    c) an auxiliary voltage generating circuit configured to generate an auxiliary voltage, wherein a negative terminal of the auxiliary voltage generating circuit is directly connected to a first input terminal of the comparison circuit, and a positive terminal of the auxiliary voltage generating circuit is directly connected the reference current generating circuit.

2. The current control circuit of claim 1, wherein the sense current flowing through the sense transistor is proportional to a current flowing through the power transistor at a first moment.

3. The current control circuit of claim 2, wherein the first moment is a time point when the sense current is equal to the reference current.

4. The current control circuit of claim 1, wherein the power terminal of the sense transistor is coupled to a power terminal of a same type of the power transistor, and a control terminal of the sense transistor is coupled to a control terminal of the power transistor.

5. The current control circuit of claim 1, wherein the sense transistor is a same type as the power transistor, and an area of the sense transistor is 1/N of an area of the power transistor, wherein N is a positive number.

6. The current control circuit of claim 1, wherein the comparison circuit is configured to compare the sense current against the reference current, and to generate the control signal.

7. The current control circuit of claim 6, wherein the comparison circuit comprises a comparator having a first input terminal directly coupled to a power terminal of the sense transistor, and a second input terminal directly coupled to a power terminal of the power transistor, and being configured to generate the control signal, wherein the power terminal of the sense transistor and the power terminal of the power transistor are a same type.

8. The current control circuit of claim 7, wherein a voltage at the second input terminal of the comparator is a fixed value when the power transistor is turned on.

9. The current control circuit of claim 7, wherein the comparator is configured to compare the voltages at the first and second input terminals, and when the voltages at the first and second input terminals of the comparator are equal, the control signal is active and the sense current is proportional to the current flowing through the power transistor.

10. The current control circuit of claim 7, wherein voltages at positive and negative power supply terminals of the comparator are a first voltage and a second voltage respectively, and the auxiliary voltage is greater than the second voltage and less than the first voltage.

11. The current control circuit of claim 10, wherein the second voltage is the voltage at one of the power terminals of the power transistor, and the first voltage is a sum of a supply voltage of the comparator and the second voltage.

12. The current control circuit of claim 1, wherein the reference current is bidirectional.

13. The current control circuit of claim 1, wherein the auxiliary voltage generating circuit comprises: a capacitor; and a voltage source coupled in parallel with the capacitor, and being configured to control the capacitor to be charged and discharged to the auxiliary voltage.

14. The current control circuit of claim 13, wherein the auxiliary voltage generating circuit further comprises a clamp circuit coupled in parallel with the capacitor, and being configured to control a voltage across the capacitor to be less than a difference between the first and second voltages.

15. The current control circuit of claim 1, wherein the sense transistor and the power transistor are both field-effect transistor (FET) devices.

16. A power converter, comprising the current control circuit of claim 1, and further comprising a power stage circuit having the power transistor.

* * * * *